United States Patent
Hu

(10) Patent No.: US 7,543,366 B2
(45) Date of Patent: Jun. 9, 2009

(54) METHOD FOR PRODUCING WRENCH SOCKET

(76) Inventor: Bobby Hu, 8F, No. 536-1, Ta Chin Street, Taichung (TW)

( * ) Notice: Subject to any disclaimer, the term of this patent is extended or adjusted under 35 U.S.C. 154(b) by 9 days.

(21) Appl. No.: 11/946,075

(22) Filed: Nov. 28, 2007

(65) Prior Publication Data

US 2008/0301928 A1 Dec. 11, 2008

(30) Foreign Application Priority Data

Jun. 8, 2007 (TW) .............................. 96120939 A
Nov. 5, 2007 (TW) .............................. 96141759 A

(51) Int. Cl.
*B23P 25/00* (2006.01)
*B25B 13/06* (2006.01)

(52) U.S. Cl. .............................. 29/458; 29/557; 72/414; 81/121.1

(58) Field of Classification Search .................. 29/458, 29/557; 72/370.04, 48, 402, 414, 416; 81/121.1
See application file for complete search history.

(56) References Cited

U.S. PATENT DOCUMENTS

| 3,752,414 | A | * | 8/1973 | Urquhart | ............... | 242/118.32 |
| 4,839,059 | A | | 6/1989 | Leupold | ...................... | 210/335 |
| 4,947,713 | A | | 8/1990 | Arnold | ........................ | 81/121.1 |
| D442,837 | S | | 5/2001 | Porras | .......................... | D8/29 |
| 6,761,093 | B2 | * | 7/2004 | Chang | ......................... | 81/121.1 |
| 7,010,998 | B2 | * | 3/2006 | Ying-Hao | .................. | 81/121.1 |
| 7,028,588 | B2 | | 4/2006 | Shih | ............................ | 81/121.1 |
| 2004/0003638 | A1 | * | 1/2004 | Schaefer et al. | ................ | 72/41 |
| 2006/0090612 | A1 | | 5/2006 | Peng | .......................... | 81/121.1 |

* cited by examiner

*Primary Examiner*—Jermie E Cozart
(74) *Attorney, Agent, or Firm*—Alan Kamrath; Kamrath & Associates PA

(57) ABSTRACT

A method for producing a wrench socket includes forging a metal blank to form a socket. An end of the socket includes an engaging hole for coupling with a wrench and an outer periphery surrounding the engaging hole. A support rod is inserted into the engaging hole of the socket. The support rod received in the engaging hole has a shape corresponding to that of the engaging hole. The outer periphery of the end of the socket is pressed to form size indicia on the outer periphery of the end of the socket. Surface treatment is carried out on the socket after the support rod is removed from the engaging hole of the socket.

20 Claims, 16 Drawing Sheets

METHOD FOR PRODUCING WRENCH SOCKET

BACKGROUND OF THE INVENTION

The present invention relates to a method for producing a wrench socket and, more particularly, to a method for producing a wrench socket having size indicia by direct pressing.

U.S. Pat. Nos. 4,839,059 and 4,947,713 both to Arnold discloses an elastomeric sleeve mounted to a rear portion of a wrench socket. The elastomeric sleeve is integrally molded from a suitable plastic, rubber or other elastomeric material. The elastomeric sleeve is provided with suitable size indicia formed by integral casting or molding. A suitable adhesive secures the sleeve on the socket and precludes an axial separation therebetween. In another embodiment disclosed in U.S. Pat. No. 4,839,059, a pressure-sensitive laminated label is bonded to the sleeve and includes size indicia formed by impression stamping, printing, engraving or other methods. However, the size indicia is not directly formed on the sleeve and involves complicated manufacturing procedures, leading to waste of time and costs.

U.S. Design Pat. No. 442,837 to Porras discloses a grippable drive socket having knurls on an outer periphery thereof and size indicia formed in the outer periphery by rolling. U.S. Pat. No. 6,761,093 to Chang and U.S. Patent Publication No. 2006/0090612 A1 also disclose socket having size indicia formed on the outer periphery by rolling. However, the distance from the size indicia to the outer periphery of the socket must be limited to avoid damage to the structural strength and/or mechanical properties of the hollow socket formed by rolling. As a result, the size indicia is liable to be damaged due to impact or abrasion.

U.S. Pat. No. 7,028,588 to Shih discloses a tool including a rectangular area formed on a cylindrical outer surface thereof. An identification mark or numeral is formed on the rectangular area as a representation of a size of the tool. The rectangular area and the numeral have different colors. The numeral is formed by cutting through the rectangular area to form a stencil for exposing a metal color of the tool and providing a contrast of the numeral to other portions of the area. Deformation of the tool resulting from stamping is avoided. However, formation of the numeral by cutting to form a stencil is much complicated and expensive. Furthermore, the numeral thus formed has a film-like structure that is liable to be damaged or become blurred due to impact or abrasion.

A need exists for a method for producing a wrench socket with size indicia that is more resistant to impact and/or abrasion.

BRIEF SUMMARY OF THE INVENTION

The present invention solves this need and other problems in the field of production of wrench sockets by providing, in a preferred example, a method for producing a wrench socket by direct pressing. The method includes forging a metal blank to form a socket including first and second ends. The first end includes an engaging hole and an outer periphery surrounding the engaging hole. The engaging hole is adapted to couple with a wrench, and the second end is adapted to drive a fastener or the like. A support rod is inserted into the engaging hole of the first end of the socket. The support rod received in the engaging hole has a shape corresponding to that of the engaging hole. The outer periphery of the first end of the socket is pressed to form size indicia on the outer periphery of the first end of the socket. The support rod is removed from the engaging hole of the socket after pressing. Then, surface treatment is carried out on the socket.

During pressing, the pressing force imparted to the socket can be effectively transmitted to the support rod fittingly received in the engaging hole whereas the support rod exerts a reactive force to the peripheral wall defining the engaging hole to avoid undesired deformation of the size indicia. Separate formation of an indicia sleeve and a socket and subsequent coupling between the indicia sleeve and the socket in the prior art methods are avoided.

An outline of the socket can be processed after forging and before inserting the support rod. Furthermore, the outline of the socket can be processed after removing the support rod and before surface treatment of the socket. Furthermore, heat treatment of the socket can be carried out after processing the outline of the socket and before surface treatment of the socket.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
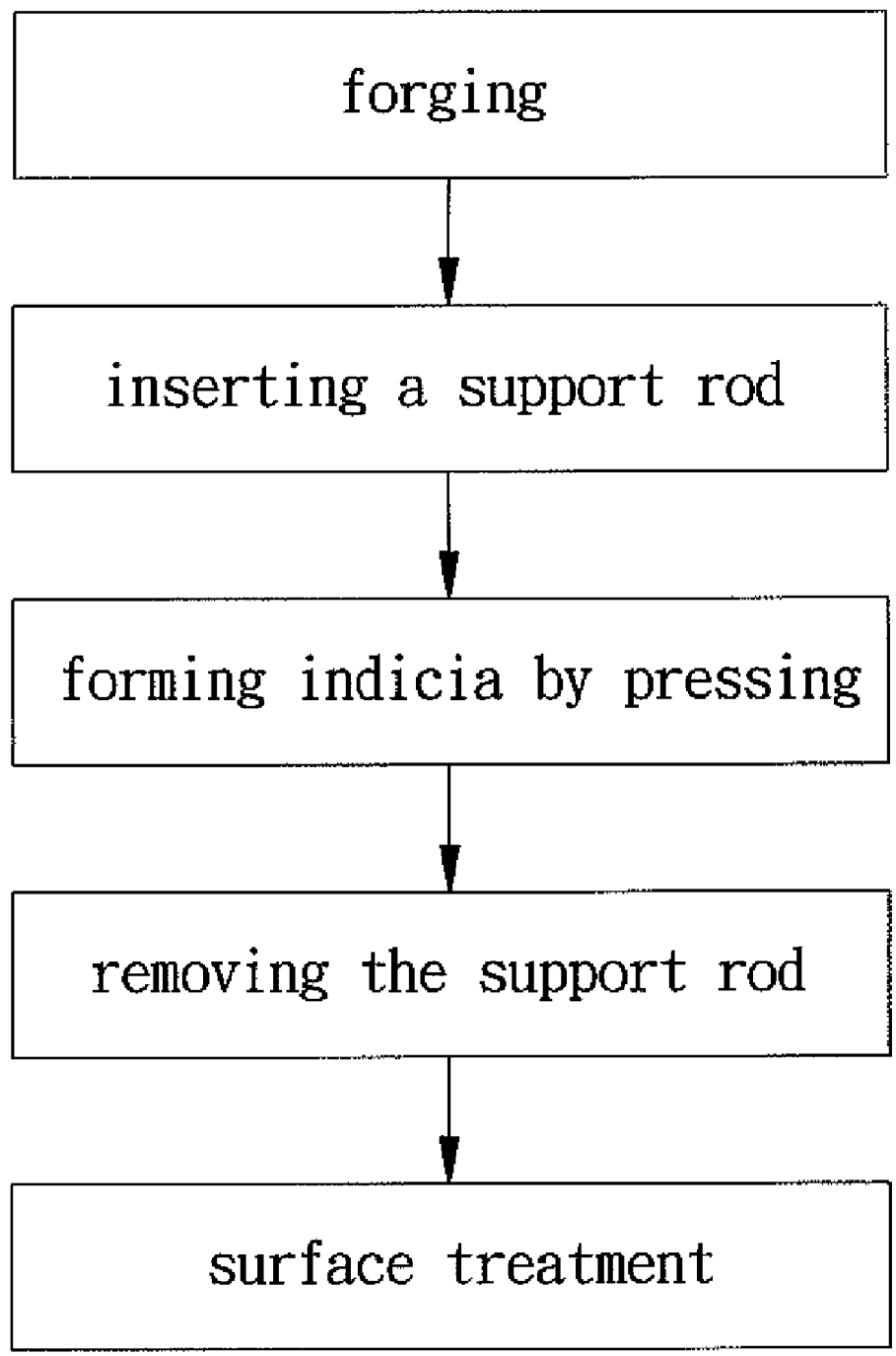
FIG. 1 shows a flowchart illustrating a method of an example according to the preferred teachings of the present invention.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "end", "portion", "section", "radial", "outward", "periphery", "length", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
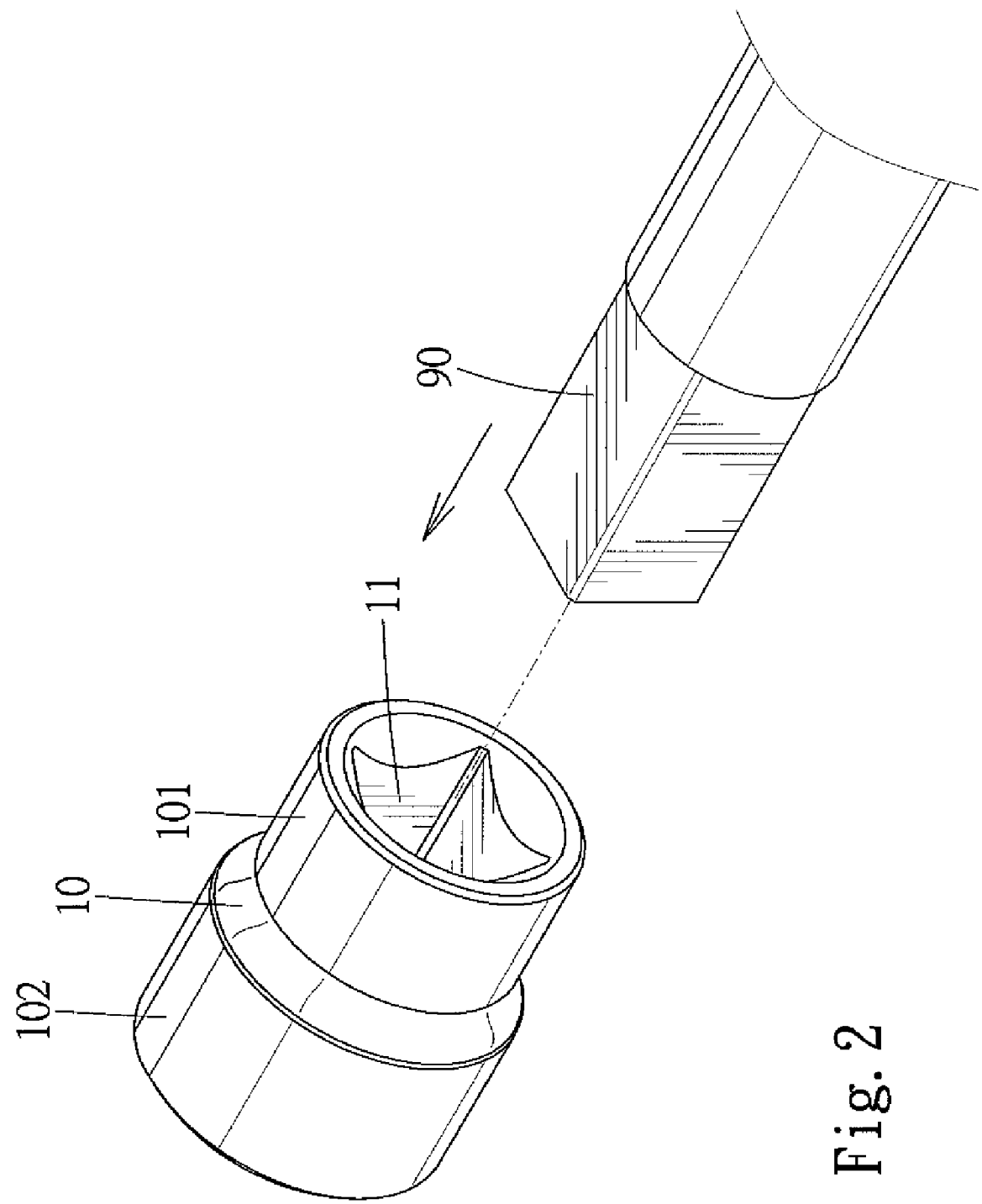
FIG. 2 shows a perspective view illustrating insertion of a support rod into a semi-product of a wrench socket.

FIG. 1 shows a flowchart illustrating a method for producing a wrench socket of an example according to the preferred teachings of the present invention. In this example, a metal blank is forged to form a socket 10. As illustrated in FIG. 2, the socket 10 includes a first end 101 having an engaging hole 11 for coupling with an engaging portion such as a drive column of a wrench and a second end 102 for coupling with and driving a fastener such as a nut, bolt head, or the like. The engaging hole 11 is shown as having square cross sections. However, the engaging hole 11 can have other cross sections including but not limited to hexagonal and dodecagonal cross sections.

A support rod 90 (FIG. 2) is then inserted into the engaging hole 11 of the first end 101 of the socket 10. An end of the support rod 90 received in the engaging hole 11 has a shape corresponding to that of the engaging hole 11. Namely, the engaging hole 11 fittingly receives the end of the support rod 90.

Figure 3:
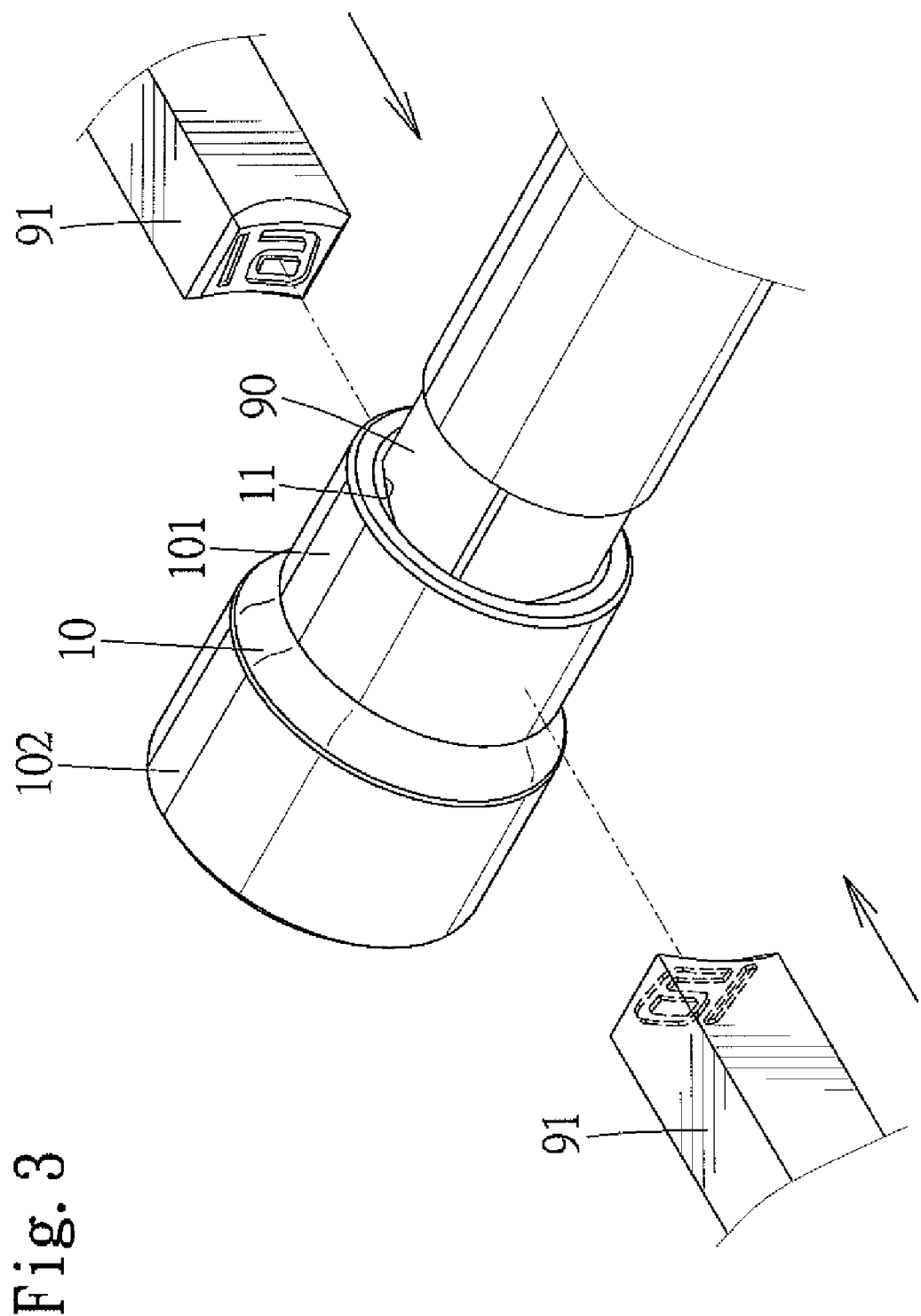
FIG. 3 shows a perspective view illustrating formation of size indicia on the semi-product of the wrench socket of FIG. 2 by pressing the semi-product with two dies.
Figure 5:
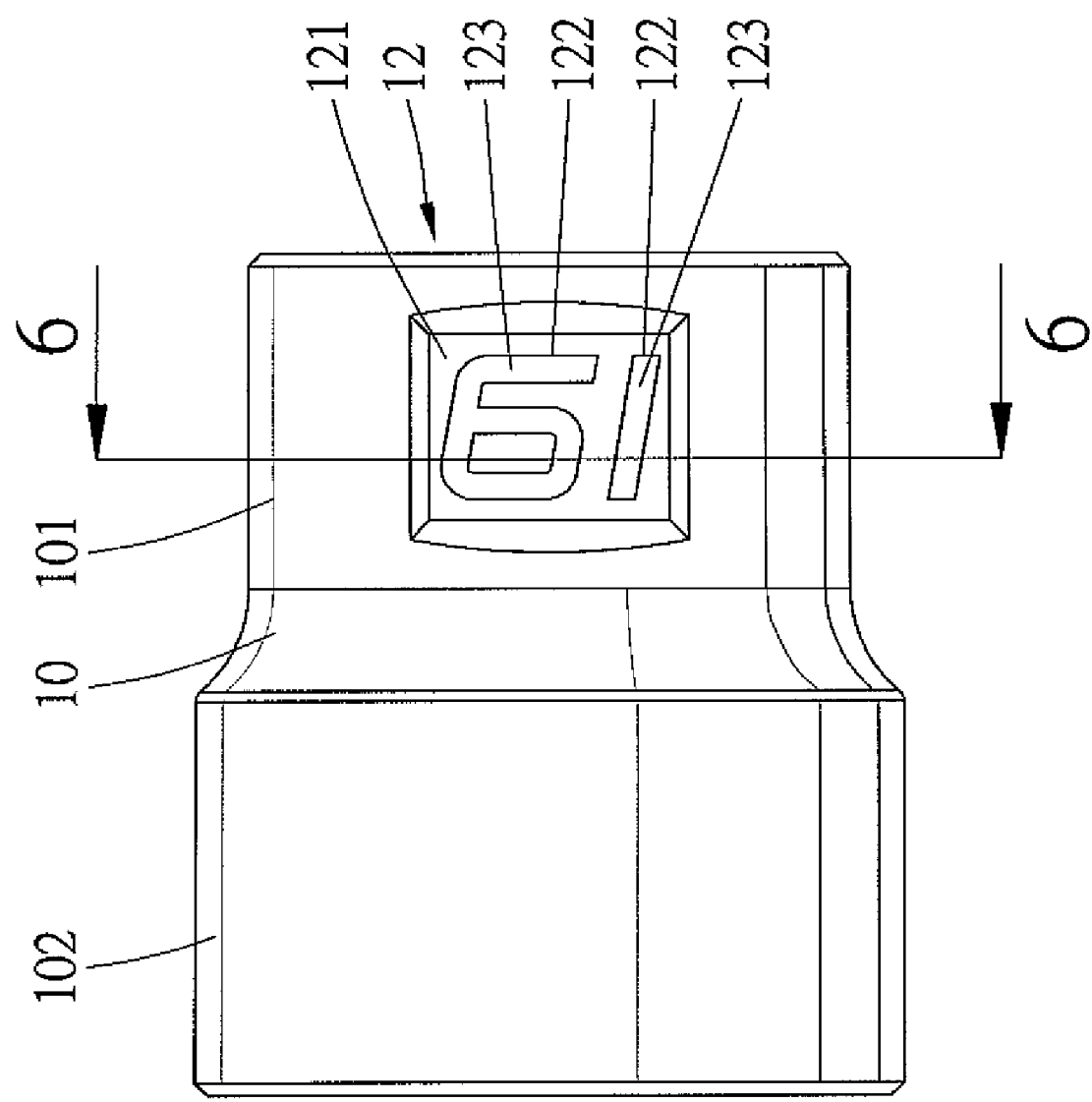
FIG. 5 shows a side elevational view of the wrench socket with two indicia areas formed with the method according to the preferred teachings of the present invention.
Figure 6:
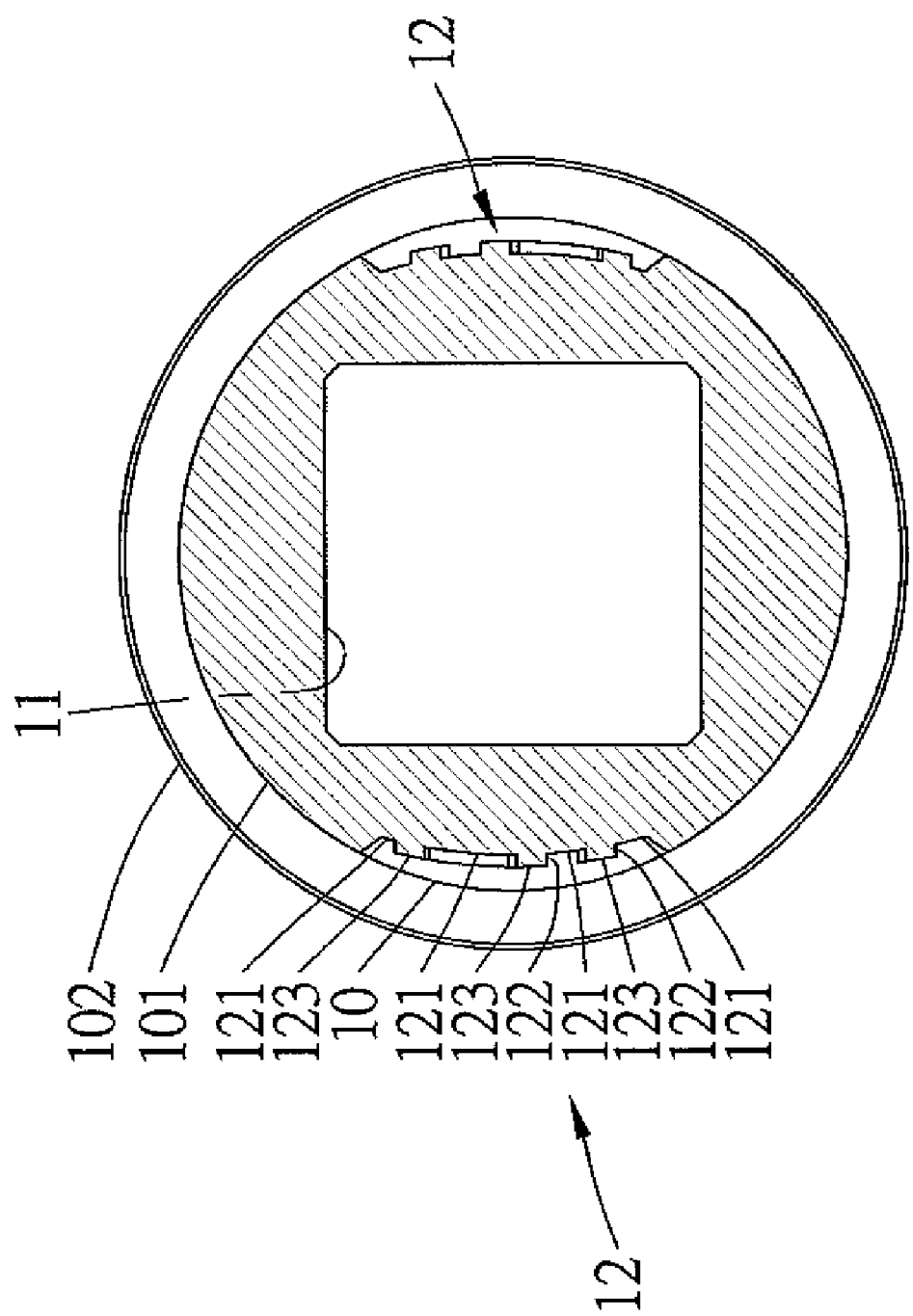
FIG. 6 shows a cross sectional view of the wrench socket of FIG. 5 according to section line 6-6 of FIG. 5.

Next, an outer periphery of the first end 101 of the socket 10 surrounding the engaging hole 11 is pressed by two dies 91 (FIG. 3) in two diametrically opposed sections thereof to form two diametrically indicia areas 12 (FIGS. 4-6) on the outer periphery of the first end 101 of the socket 10. During pressing, the pressing forces imparted from the dies 91 to the socket 10 can be effectively transmitted to the support rod 90 fittingly received in the engaging hole 11 whereas the support rod 90 exerts a reactive force to the peripheral wall defining the engaging hole 11 to avoid undesired deformation of the indicia areas 12.

The indicia areas 12 is formed on the first end 101 of the socket 10 rather than on the second end 102, for the wall thickness of the first end 101 is larger than that of the second end 102 and, thus, allows direct pressing on the outer periphery of the first end 101 without the risk of undesired deformation of and/or damage to the socket 10. Separate formation of an indicia sleeve and a socket and subsequent coupling between the indicia sleeve and the socket in the prior art methods are avoided.

Figure 10:
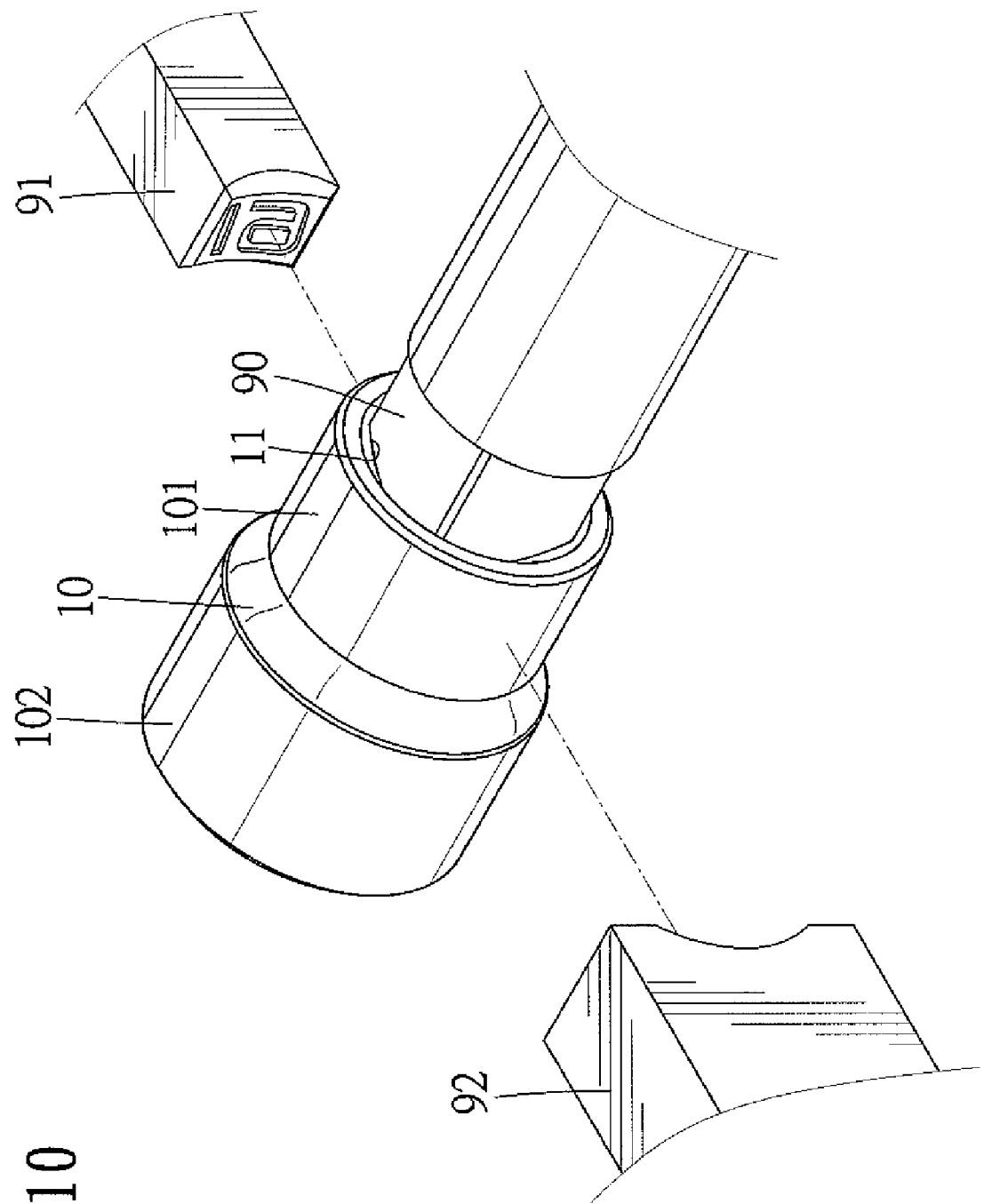
FIG. 10 shows a perspective view illustrating formation of size indicia on a semi-product of a wrench socket by pressing the semi-product with a die and a pressing rod.
Figure 11:
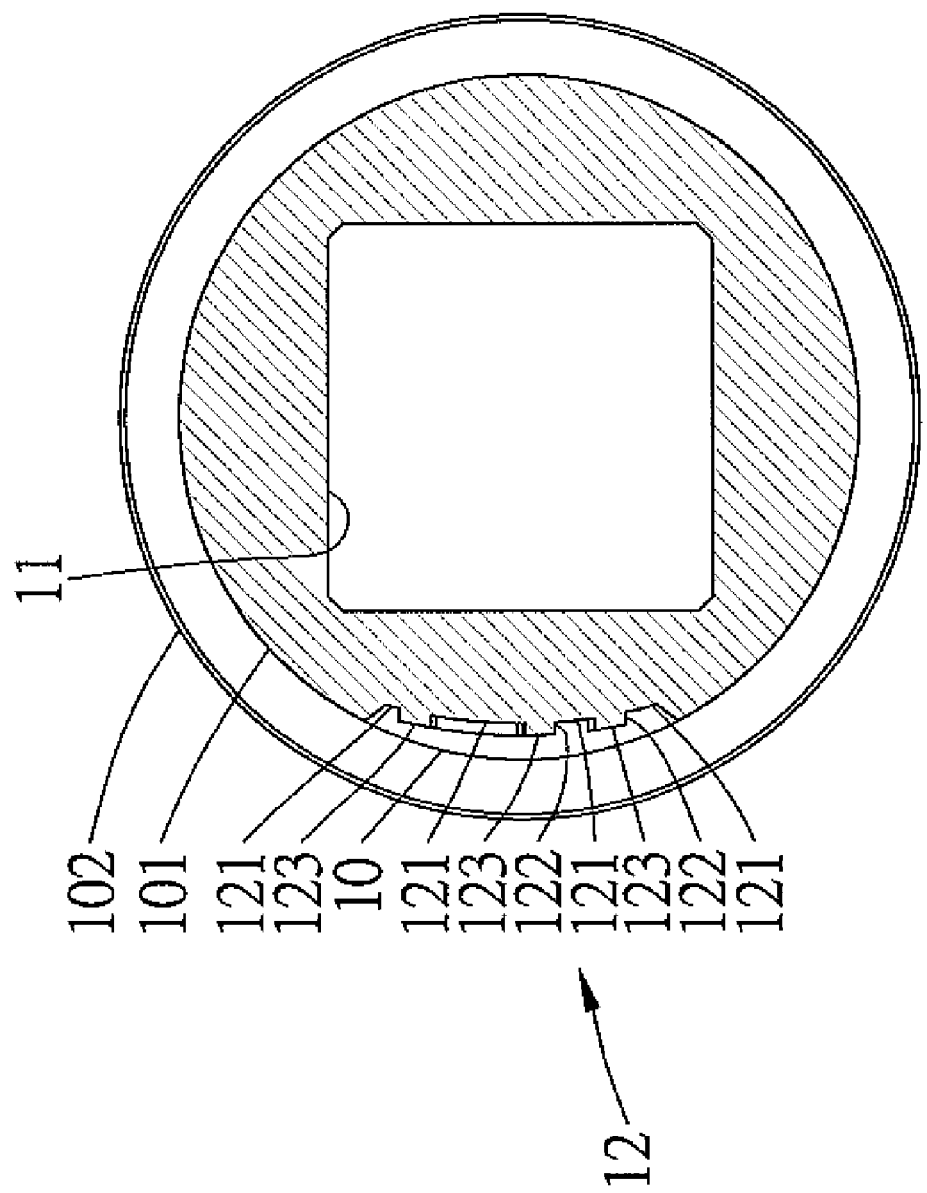
FIG. 11 shows a cross sectional view of a wrench socket with a single indicia area.
Figure 16:
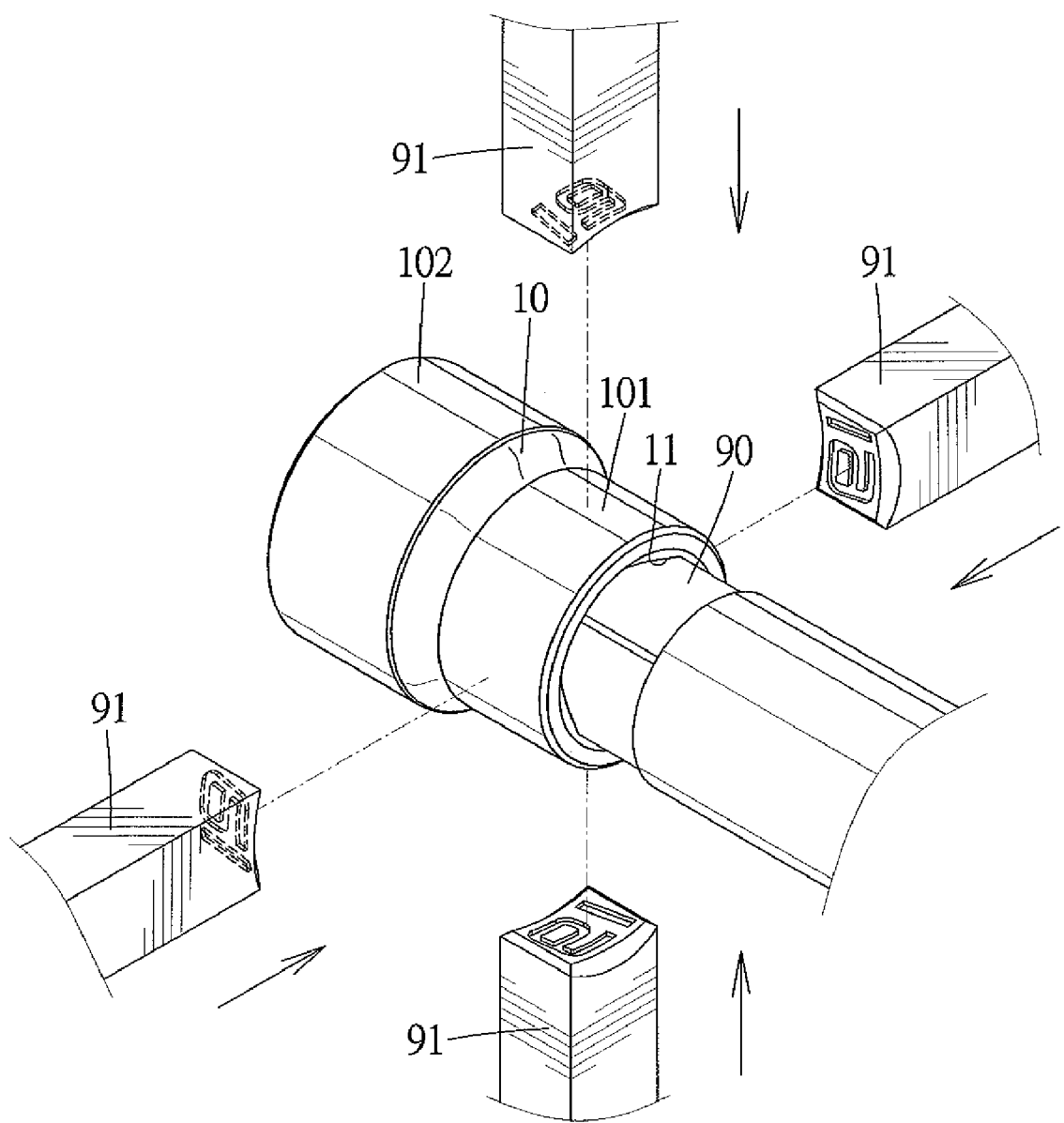
FIG. 16 shows a perspective view illustrating formation of size indicia on a semi-product of a wrench socket by pressing the semi-product with four dies.

It can be appreciated that one of the dies 91 can be replaced with a pressing rod 92 (FIG. 10) to form a single indicia area 12 on the socket 10. It can be further appreciated that more dies 91 can be utilized to form more than two indicia areas 12 on the outer periphery of the first end 101 of the socket 10. For example, the first end 101 of the socket 10 can be pressed with four dies 91 (FIG. 16) at two pairs of diametrically opposed sections of the outer periphery of the first end 101 to form four indicia areas 12.

Figure 4:
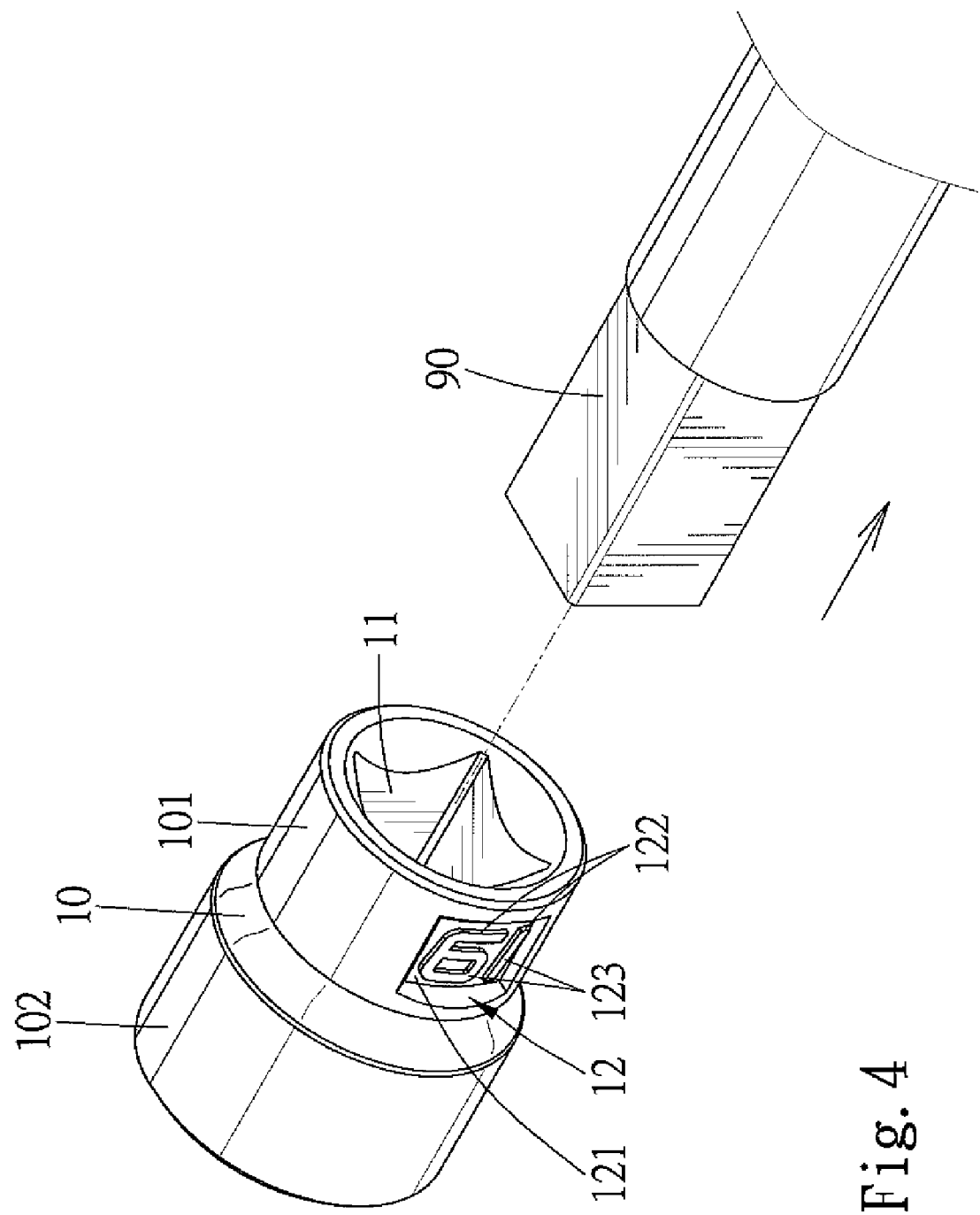
FIG. 4 shows a perspective view illustrating removal of the support rod after formation of the size indicia.

After formation of the indicia areas 12, the support rod 90 is removed from the engaging hole 11 of the socket 10 (FIG. 4).

Each indicia area 12 includes a bottom wall 121 below the outer periphery of the first end 101 in a radial direction. Each indicia area 12 further includes size indicia 122 protruding radially outward and having a height not beyond the outer periphery of the first end 101 of the socket 10. Namely, a top 123 of the size indicia 122 is below the outer periphery of the first end 101 of the socket 10.

Figure 7:
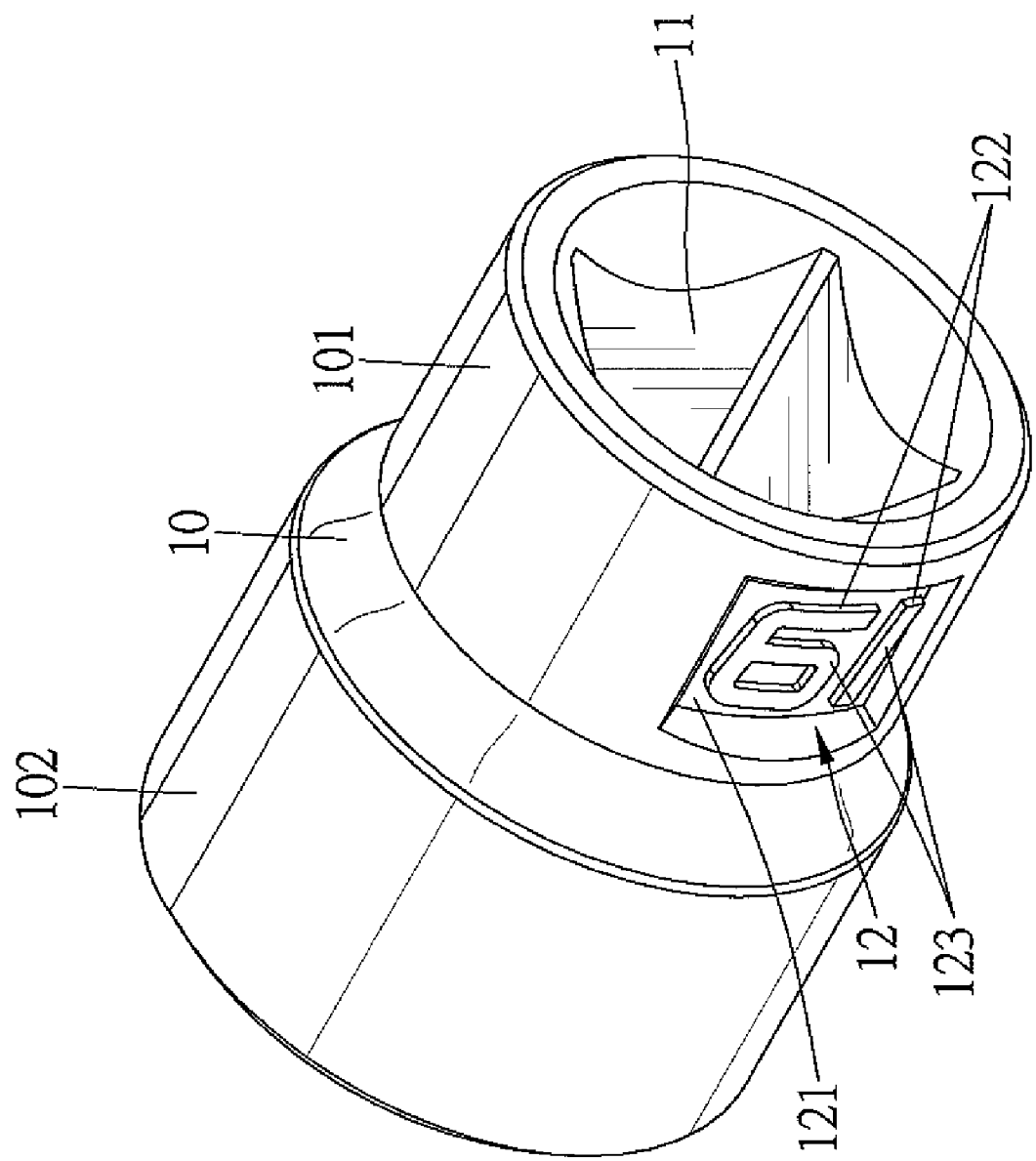
FIG. 7 shows a perspective view of a final product of the wrench socket of FIG. 5.

The socket 10 can be subjected to surface treating to obtain a final product of a wrench socket 10 with two indicia areas 12 (FIG. 7). Surface treatment includes vibration polishing treatment including chemical surface treatment. The vibration polishing treatment is followed by electroplating the outer periphery of the socket 10. Other surface treatment can be utilized. For example, the vibration polishing treatment can be followed by sand blasting the outer periphery of the socket 10 to obtain the required surface treating effect and to obtain the final product of the wrench socket 10.

Figure 8:
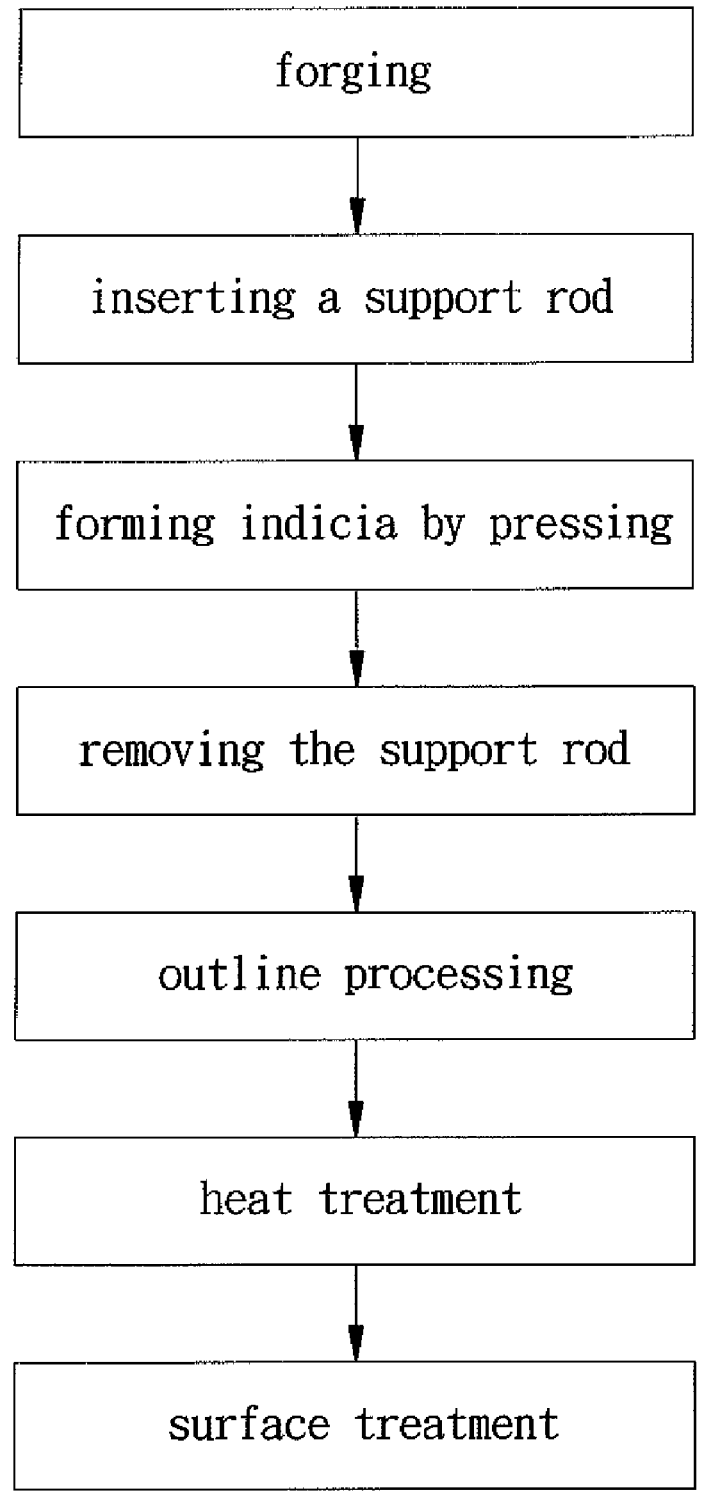
FIG. 8 shows a flowchart illustrating a method of another example according to the preferred teachings of the present invention.

FIG. 8 shows a flowchart illustrating a method of another example according to the preferred teachings of the present invention. Compared to the flowchart of FIG. 1, in the example of the method according to the preferred teachings of the present invention shown in FIG. 8, the outline of the socket 10 is processed to a desired specification and then subjected to heat treatment after removing the support rod 90 and before surface treating the socket 10. The outline processing includes milling a peripheral wall defining the engaging hole 11 of the first end 101 of the socket 10 to form a groove that is capable of retaining the drive column of the wrench in the engaging hole 11, preventing disengagement of the socket 11 during operation of the socket wrench. The outline processing can further include finish milling or rough milling of the socket 10. For example, the outline processing can include milling two end faces of the socket 10 to provide the socket 10 with a length of the desired specification, trimming the outer periphery of the socket 10 by milling, and/or surface polishing the outer periphery of the socket 10 by grinding including but not limited to centerless grinding. The heat treatment is carried out after outline processing and before surface treatment of the socket 10 to provide the socket 10 with the desired structural strength. It can be appreciated that the outline processing after removal of the support rod 90 and before surface treatment of the socket 10 is carried out to eliminate possible deformation of the socket 10 after pressing.

Figure 9:
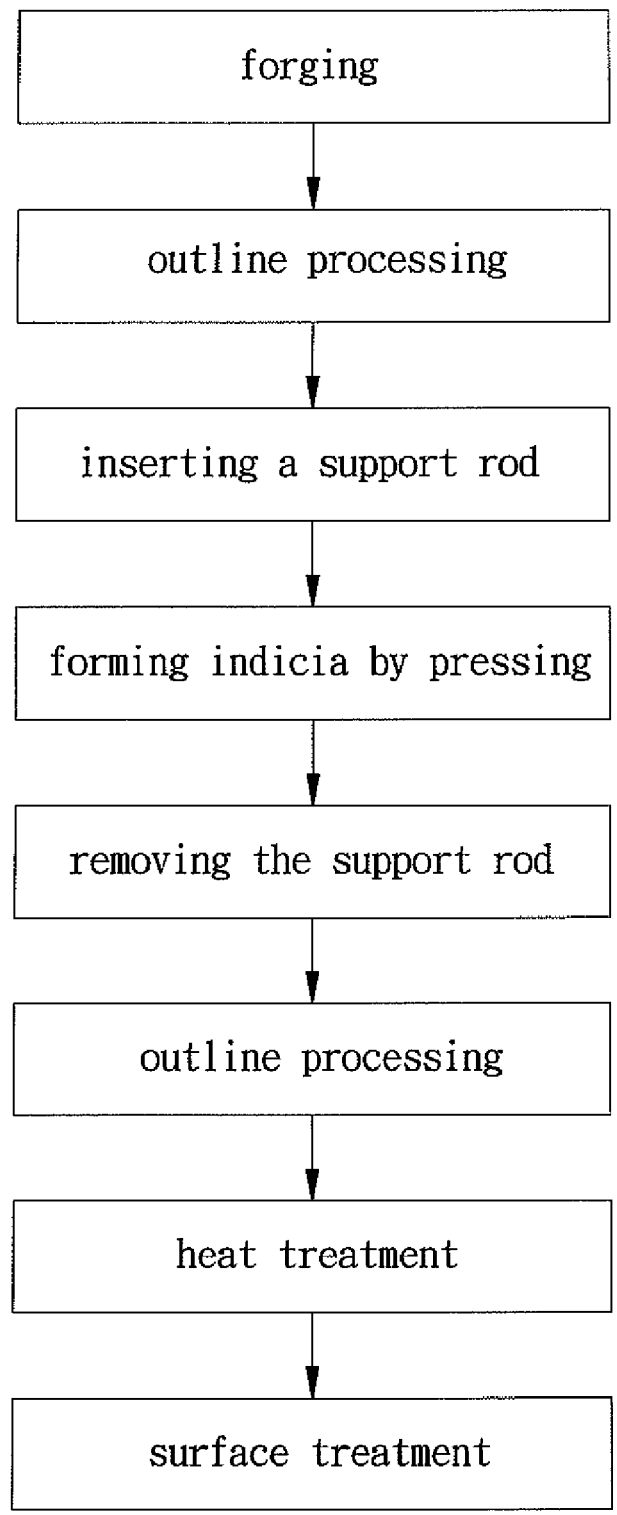
FIG. 9 shows a flowchart illustrating a method of a further example according to the preferred teachings of the present invention.

FIG. 9 shows a flowchart illustrating a method of a further example according to the preferred teachings of the present invention. Compared to the flowchart of FIG. 8, the example of the method according to the preferred teachings of the present invention shown in FIG. 9 further includes processing the outline of the socket 10 to the desired specification after forging and before insertion of the support rod 90. The outline processing after forging and before insertion of the support rod 90 can include milling the first and second ends 101 and 102 of the socket 10 to different diameters. The outline processing after forging and before insertion of the support rod 90 can further include finish milling or rough milling of the socket 10. For example, the outline processing after forging and before insertion of the support rod 90 can include milling two end faces of the socket 10 to provide the socket 10 with a length of the desired specification and/or surface polishing the outer periphery of the socket 10 by grinding. It can be appreciated that outline processing can be carried out after removal of the support rod 90 and before surface treatment of the socket 10 to eliminate possible deformation of the socket 10 after pressing.

Figure 15:
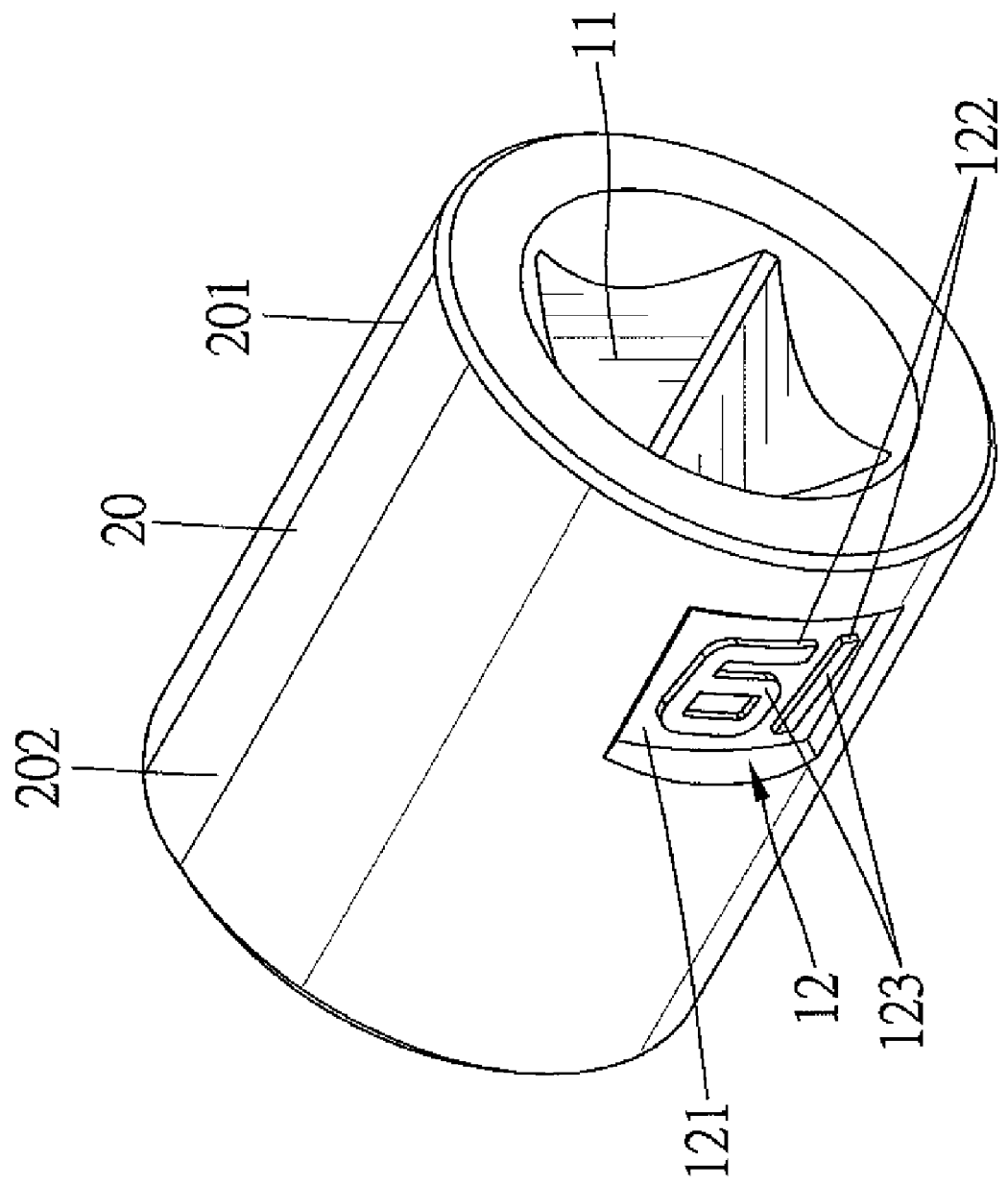
FIG. 15 shows a perspective view of a further wrench socket produced by the method according to the preferred teachings of the present invention.

The socket 10 shown in FIG. 7 is a so-called European-type socket in which the first end 101 and the second end 102 have different diameters whereas a shoulder is formed between the first and second ends 101 and 102. However, the method according to the preferred teachings of the present invention can be utilized to produce sockets of other types such as the so-called American-type socket 20 shown in FIG. 15 in which first and second ends 201 and 202 of the socket 20 have identical diameter without shoulders therebetween. It can be appreciated that one or more indicia areas 122 can be formed on the outer periphery of the first end 201 of the socket 20 having an engaging hole 11 for coupling with a wrench.

Figure 12:
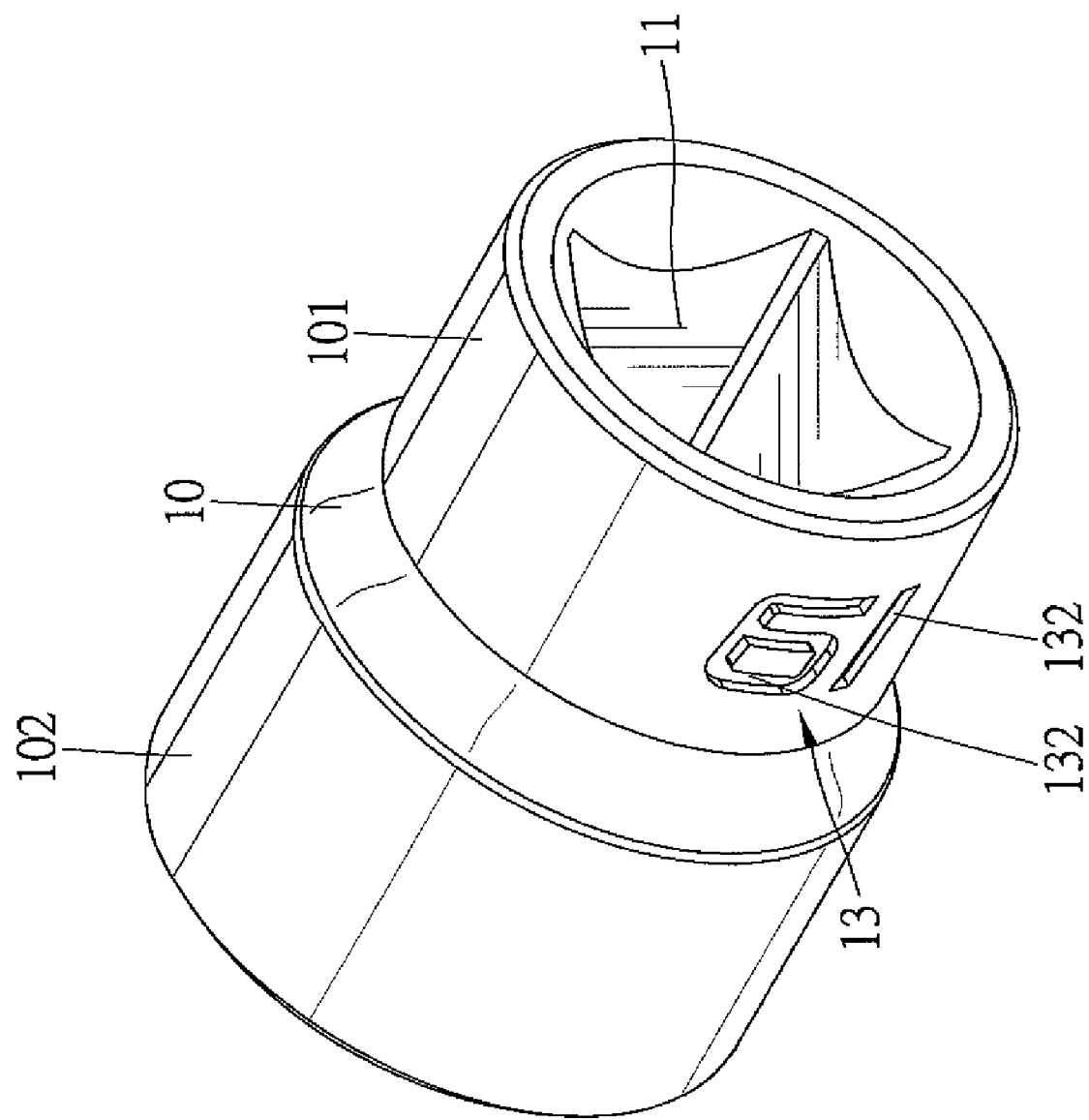
FIG. 12 shows a perspective view of another wrench socket produced by the method according to the preferred teachings of the present invention.
Figure 13:
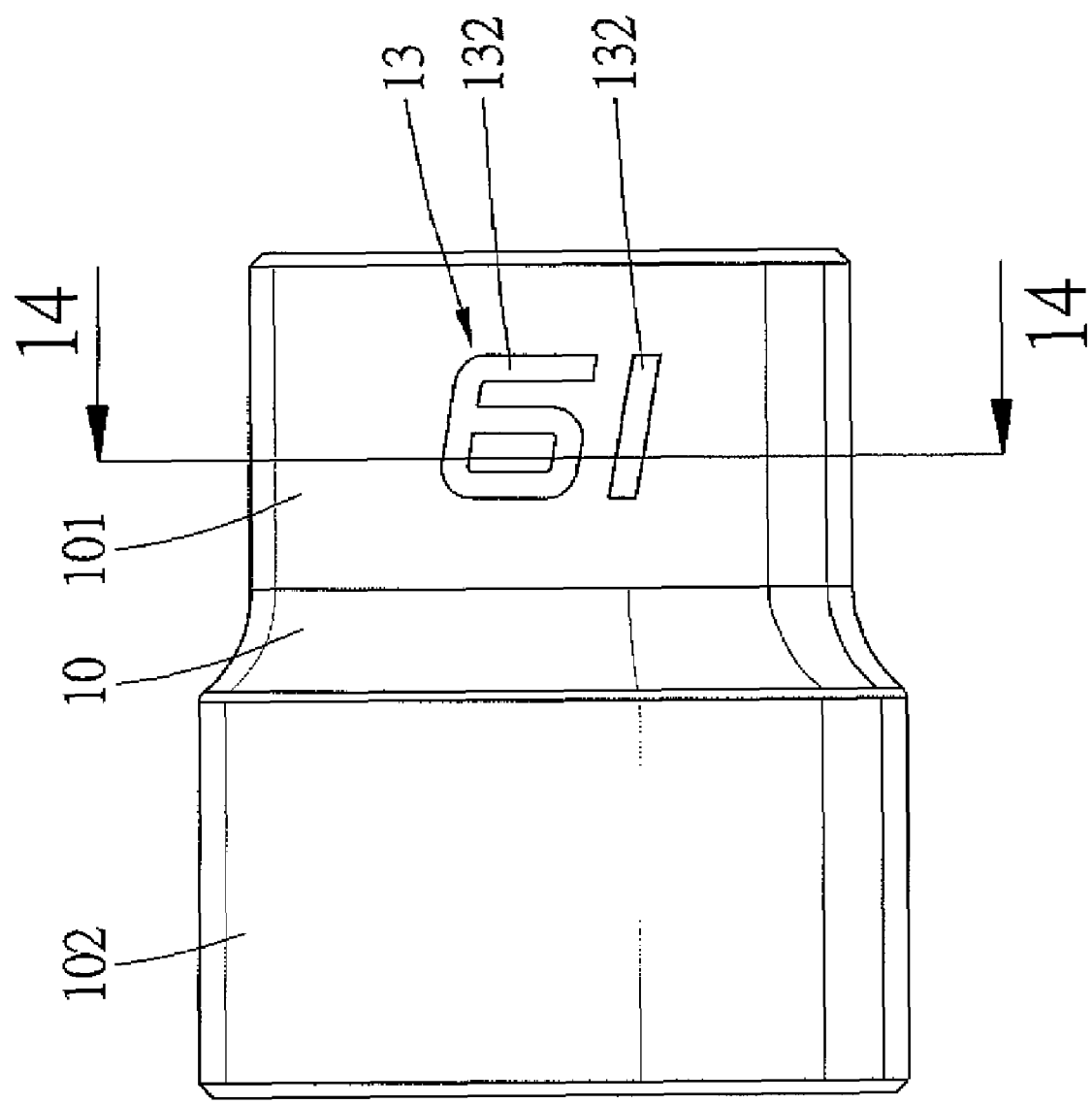
FIG. 13 shows a side elevational view of the wrench socket of FIG. 12
Figure 14:
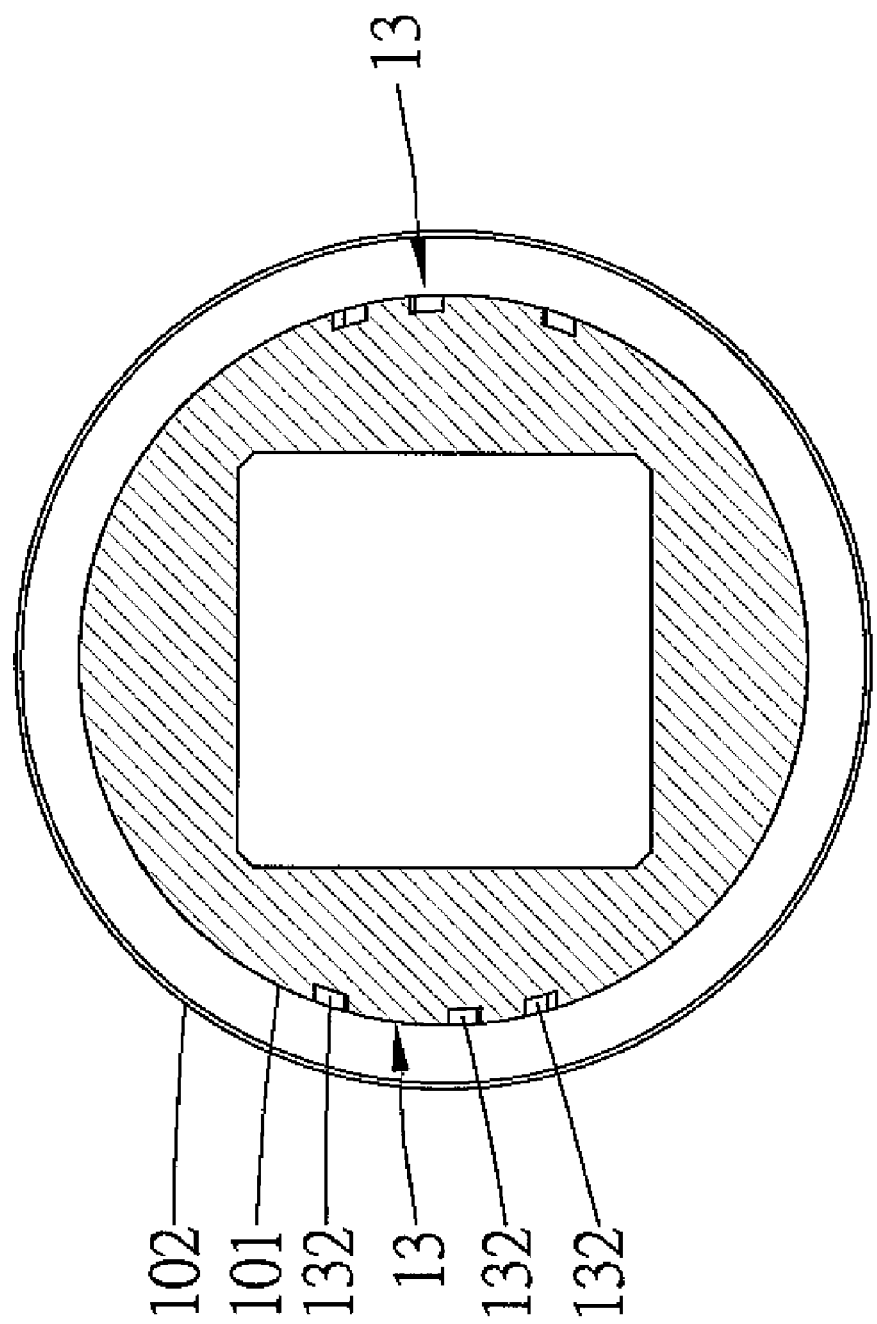
FIG. 14 shows a cross sectional view of the wrench socket of FIG. 13 according to section line 14-14 of FIG. 13.

The dies 90 can have other forms to form different size indicia on the socket 10. For example, the socket 10 shown in FIGS. 12 to 14 includes two indicia areas 13 each having size indicia 132 protruding radially inward from the outer periphery of the first end 101 of the socket 10. Other forms of the indicia areas 12, 13 and the size indicia 122, 132 would be within the skill of the art.

According to the preferred teachings of the present invention, the size indicia 122, 132 of the socket 10 is formed by direct pressing during which the pressing force imparted to the socket 10 can be effectively transmitted to the support rod 90 without causing deformation of and damage to the indicia 122, 132. The disadvantages of conventional methods involving separate formation of an indicia sleeve and a socket and subsequent coupling between the indicia sleeve and the socket are avoided. Furthermore, the socket 10 can be produced at low costs by the method according to the preferred teachings of the present invention. Furthermore, the method according to the preferred teachings of the present invention can be utilized to form trademarks or other marks on the outer periphery of the socket 10 according to product needs.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A method for producing a wrench socket comprising:
forging a metal blank to form a socket including first and second ends, with the first end including an engaging hole and an outer periphery surrounding the engaging hole, with the engaging hole being adapted to couple with a wrench, with the second end being adapted to drive a fastener;
inserting a support rod into the engaging hole of the first end of the socket, with the support rod received in the engaging hole having a shape corresponding to that of the engaging hole;
pressing the outer periphery of the first end of the socket to form size indicia on the outer periphery of the first end of the socket;
removing the support rod from the engaging hole of the socket after pressing; and
surface treating the socket.

2. The method for producing a wrench socket as claimed in claim 1, further comprising processing an outline of the socket to a desired specification after removing the support rod and before surface treating the socket.

3. The method for producing a wrench socket as claimed in claim 2, further comprising processing the outline of the socket to the desired specification after forging and before inserting the support rod.

4. The method for producing a wrench socket as claimed in claim 2, with processing the outline of the socket to the desired specification after removing the support rod and before surface treating the socket including milling two end faces of the socket to provide the socket with a length of the desired specification.

5. The method for producing a wrench socket as claimed in claim 2, with processing the outline of the socket to the desired specification after removing the support rod and before surface treating the socket including milling a peripheral wall defining the engaging hole of the first end of the socket to form a groove in the peripheral wall defining the engaging hole, with the groove being adapted for preventing the socket from disengaging from the wrench during operation of the wrench.

6. The method for producing a wrench socket as claimed in claim 2, with processing the outline of the socket to the desired specification after removing the support rod and before surface treating the socket including trimming an outer periphery of the socket by milling.

7. The method for producing a wrench socket as claimed in claim 2, with processing the outline of the socket to the desired specification after removing the support rod and before surface treating the socket including surface polishing an outer periphery of the socket by grinding.

8. The method for producing a wrench socket as claimed in claim 2, further comprising heat treating the socket to provide the socket with a desired structural strength after processing the outline of the socket and before surface treating the socket.

9. The method for producing a wrench socket as claimed in claim 2, with surface treating the socket including vibration polishing the socket and then sand blasting an outer periphery of the socket.

10. The method for producing a wrench socket as claimed in claim 2, with surface treating the socket including vibration polishing the socket and then electroplating an outer periphery of the socket.

11. The method for producing a wrench socket as claimed in claim in claim 1, further comprising processing an outline of the socket to a desired specification after forging and before inserting the support rod.

12. The method for producing a wrench socket as claimed in claim 11, with processing the outline of the socket to the desired specification after forging and before inserting the support rod including milling the first and second ends of the socket to different diameters.

13. The method for producing a wrench socket as claimed in claim 11, with processing the outline of the socket to the desired specification after forging and before inserting the support rod including milling two end faces of the socket to provide the socket with a length of the desired specification.

14. The method for producing a wrench socket as claimed in claim 11, with processing the outline of the socket to the desired specification after forging and before inserting the support rod including surface polishing an outer periphery of the socket by grinding.

15. The method for producing a wrench socket as claimed in claim 11, further comprising heat treating the socket to provide the socket with a desired structural strength after removing the support rod and before surface treating the socket.

16. The method for producing a wrench socket as claimed in claim 11, with surface treating the socket including vibration polishing the socket and then sand blasting an outer periphery of the socket.

17. The method for producing a wrench socket as claimed in claim 11, with surface treating the socket including vibration polishing the socket and then electroplating an outer periphery of the socket.

18. The method for producing a wrench socket as claimed in claim 1 with pressing the outer periphery of the first end of the socket including pressing the outer periphery of the first end with two dies on two diametrically opposed sections of the outer periphery of the first end to form the size indicia in the two sections.

19. The method for producing a wrench socket as claimed in claim 1, with pressing the outer periphery of the first end of the socket including pressing the outer periphery of the first end with a die on a first section of the outer periphery of the first end and with a pressing rod on a second section of the outer periphery of the first end diametrically opposite to the first area, forming the indicia in the first section.

20. The method for producing a wrench socket as claimed in claim 1, with pressing the outer periphery of the first end of the socket including pressing the outer periphery of the first end with four dies on two pairs of diametrically opposed sections of the outer periphery of the first end to form the size indicia in the two pairs of sections.

* * * * *